US008850312B2

(12) United States Patent
Ikazaki et al.

(10) Patent No.: US 8,850,312 B2
(45) Date of Patent: Sep. 30, 2014

(54) IMAGE FORMING APPARATUS AND METHOD OF DISPLAYING PREVIEW IMAGE

(75) Inventors: Akihiko Ikazaki, Osaka (JP); Tetsuya Matsusaka, Osaka (JP)

(73) Assignee: Kyocera Document Solutions Inc. (JP)

( * ) Notice: Subject to any disclaimer, the term of this patent is extended or adjusted under 35 U.S.C. 154(b) by 686 days.

(21) Appl. No.: 12/640,545

(22) Filed: Dec. 17, 2009

(65) Prior Publication Data

US 2010/0162106 A1 Jun. 24, 2010

(30) Foreign Application Priority Data

Dec. 24, 2008 (JP) ................................ P2008-327834
Dec. 24, 2008 (JP) ................................ P2008-327868

(51) Int. Cl.
*G06F 17/27* (2006.01)
*H04N 1/00* (2006.01)
*G03G 15/00* (2006.01)
*G06F 3/048* (2013.01)

(52) U.S. Cl.
CPC ................................. *H04N 1/0044* (2013.01); *G03G 15/502* (2013.01)
USPC ........... 715/273; 715/200; 715/201; 715/204; 715/211; 715/238; 715/243; 715/251; 715/274

(58) Field of Classification Search
USPC ......... 715/200, 201, 204, 211, 238, 243, 251, 715/273, 274
See application file for complete search history.

(56) References Cited

U.S. PATENT DOCUMENTS

| | | | | |
|---|---|---|---|---|
| 5,321,770 A | * | 6/1994 | Huttenlocher et al. | 382/174 |
| 6,281,983 B1 | | 8/2001 | Takahashi et al. | 358/1.2 |
| 7,158,878 B2 | * | 1/2007 | Rasmussen et al. | 701/208 |
| 7,343,052 B2 | * | 3/2008 | Roth et al. | 382/299 |
| 7,454,697 B2 | * | 11/2008 | Kremer et al. | 715/251 |
| 2001/0006560 A1 | * | 7/2001 | Gilman et al. | 382/162 |
| 2002/0054300 A1 | * | 5/2002 | Trenz | 358/1.2 |
| 2004/0001106 A1 | * | 1/2004 | Deutscher et al. | 345/838 |
| 2004/0130635 A1 | | 7/2004 | Kasai | 348/231.99 |
| 2005/0041858 A1 | * | 2/2005 | Celi et al. | 382/173 |
| 2005/0116966 A1 | * | 6/2005 | Graham et al. | 345/661 |
| 2006/0070000 A1 | * | 3/2006 | Ichikawa | 715/730 |
| 2007/0091372 A1 | * | 4/2007 | Matsuki | 358/1.18 |
| 2007/0216973 A1 | * | 9/2007 | Tagawa | 358/527 |
| 2008/0278770 A1 | | 11/2008 | Sakuramata | 358/448 |

FOREIGN PATENT DOCUMENTS

| | | |
|---|---|---|
| JP | 09-093378 | 4/1997 |
| JP | 10-260918 | 9/1998 |
| JP | 2005-110088 | 4/2005 |
| JP | 2006-146662 | 6/2006 |
| JP | 2006-203752 | 8/2006 |

* cited by examiner

*Primary Examiner* — Stephen Hong
*Assistant Examiner* — Wilson Tsui
(74) *Attorney, Agent, or Firm* — Ostrolenk Faber LLP (57) ABSTRACT

An image forming apparatus includes an image forming unit, a whole preview image generating unit that generates a whole preview image, the whole preview image being a print preview image of the entirety of each page, a display unit, a whole preview image display control unit that controls displaying the whole preview image, a divided preview image generating unit that generates divided preview images, the divided preview images being made by dividing the print preview image of each page by a dividing number, a divided preview image enlarging unit that enlarges each of the divided preview images at higher magnification than a display magnification of the whole preview image and generates enlarged divided preview images, and a divided preview image display control unit that controls displaying the enlarged divided preview images.

17 Claims, 8 Drawing Sheets

IMAGE FORMING APPARATUS AND METHOD OF DISPLAYING PREVIEW IMAGE

BACKGROUND OF THE INVENTION

1. Field of the Invention

The present invention relates to an image forming apparatus and a method of displaying preview image.

Priority is claimed on Japanese Patent Applications No. 2008-327834, filed Dec. 24, 2008, and No. 2008-327868, filed Dec. 24, 2008, the contents of which are incorporated herein by reference.

2. Description of the Related Art

Until recently, multifunction printers or image forming apparatus have a function of displaying a preview image. The function is to display a print preview image that shows a result of printing print target data in a display unit before the data is actually printed. The display unit may be a liquid crystal display, for example.

User can confirm that various settings of printing such as size, zooming, 2 in 1, etc. are right to print the data as the user wants by seeing the print preview image. The print preview image is displayed with respect to each page of the print target data.

An image forming apparatus includes a display unit such as a liquid crystal display. A print preview image is displayed on the display unit. Size of the display unit is not so large in many cases. When the print preview image is displayed with respect to each page of print target data, user can confirm only total image such as printing layout but cannot confirm detailed contents of the print target data in the conventional art. Those are disposed in Japanese Unexamined Patent Application, First Publication, No. 2006-146662, for example.

SUMMARY

An image forming apparatus of the present invention includes an image forming unit that prints image on papers based on print target data, a whole preview image generating unit that generates a whole preview image based on the print target data, the whole preview image being a print preview image of the entirety of each page, a display unit that displays image, a whole preview image display control unit that controls the display unit displaying the whole preview image, a divided preview image generating unit that generates divided preview images, the divided preview images being made by dividing the print preview image of each page in the print target data by a dividing number, the dividing number being set beforehand, a divided preview image enlarging unit that enlarges each of the divided preview images at higher magnification than a display magnification of the whole preview image of the display unit and generates a enlarged divided preview images, and a divided preview image display control unit that controls the display unit displaying the enlarged divided preview images.

A method of displaying preview image that is performed in an image forming apparatus of the present invention, wherein the image forming apparatus comprises an image forming unit and a display unit, a whole preview image is displayed on the display unit, the whole preview image is a print preview image of the entirety of each page, the whole preview image is generated from a print target data that is printed on paper, and the method of displaying preview image includes generating divided preview images that is generated by dividing the print preview image of each page of the print target data by a dividing number set beforehand, enlarging each of the divided preview images in larger magnification than display magnification of the whole preview image in the display unit, and displaying each of the enlarged divided preview images on the display unit.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PREFERRED EMBODIMENTS

The present invention will be now described herein with reference to illustrative embodiments. Those skilled in the art will recognize that many alternative embodiments can be accomplished using the teaching of the present invention and that the invention is not limited to the embodiments illustrated for explanatory purpose.

First Embodiment

A multifunction printer X is an example of an image forming apparatus of the present invention. The present invention can be applied to an image forming apparatus such as a printer device, a copying machine, a facsimile machine, etc.

(Scheme of Configuration of Multifunction Printer)

Figure 1:
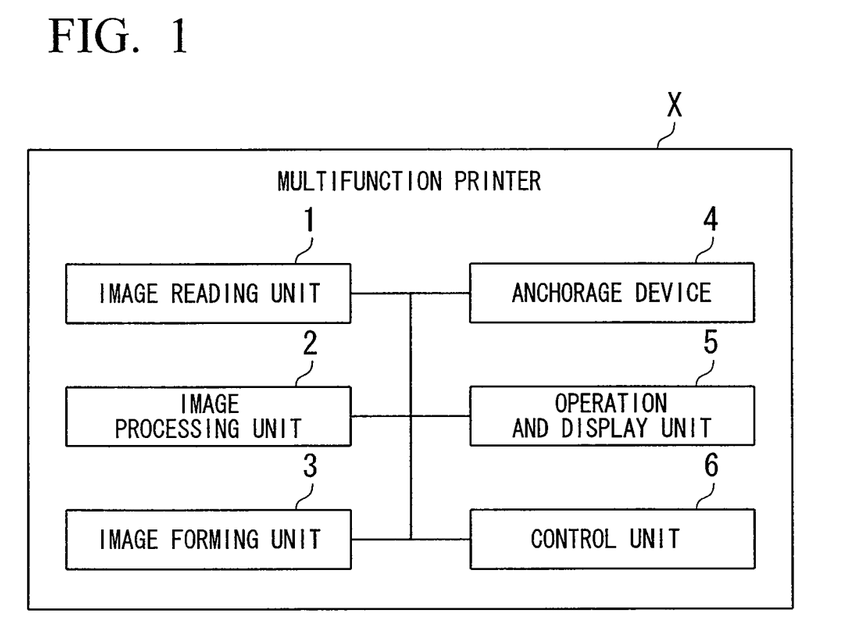
FIG. 1 is a block diagram illustrating a scheme of configuration of a multifunction printer in accordance with a first preferred embodiment of the present invention.

FIG. 1 is a block diagram illustrating a scheme of configuration of the multifunction printer X in accordance with a first preferred embodiment of the present invention. With reference to FIG. 1, the multifunction printer X may include, but is not limited to, an image reading unit 1, an image processing unit 2, an image forming unit 3, an anchorage device 4, an operation and display unit 5, and a control unit 6. The multifunction printer X is an image forming apparatus of the electrophotography method.

The multifunction printer X further includes various components that realize various functions of printer function, copy function, scanner function, and facsimile functions etc. These components can be realized by a prior art, and description of the components will be omitted.

The image reading unit 1 reads an image data from a manuscript set in a manuscript stand or an auto document feeder. Specifically, the image reading unit 1 includes a reading element such as a CCD (Charge Coupled Device).

The image processing unit 2 performs various image processing about print target data such as the image data read in the image reading unit 1, an image data memorized beforehand by a storage device, an image data received from an external information processing device, etc. The image processing unit 2 converts the image data in red, green, blue (RGB) which the image reading unit 1 has read into an image data expressed in cyan, magenta, yellow, and key (black) (CMYK).

The image forming unit 3 may include, but is not limited to, a photo conductor drum, an electrification device, a developing device, an LSU (laser scan unit), etc. The image forming unit 3 forms a toner image that is a developer in paper based on the image data expressed in CMYK.

The anchorage device 4 may include, but is not limited to, a heat roller and a crimping roller. The anchorage device 4 performs fusing of the toner image that is formed in the image forming unit 3 on the paper.

The operation and display unit 5 may include, but is not limited to, a liquid crystal display, a touch panel, a key switch such as a start key, etc. The liquid crystal display displays various kinds of information based on instructions from the control unit 6. The touch panel or the key switch receives instruction entries by user such as a processing request. That is, the operation and display unit 5 is an example of a display unit and an entry unit.

Figure 3:
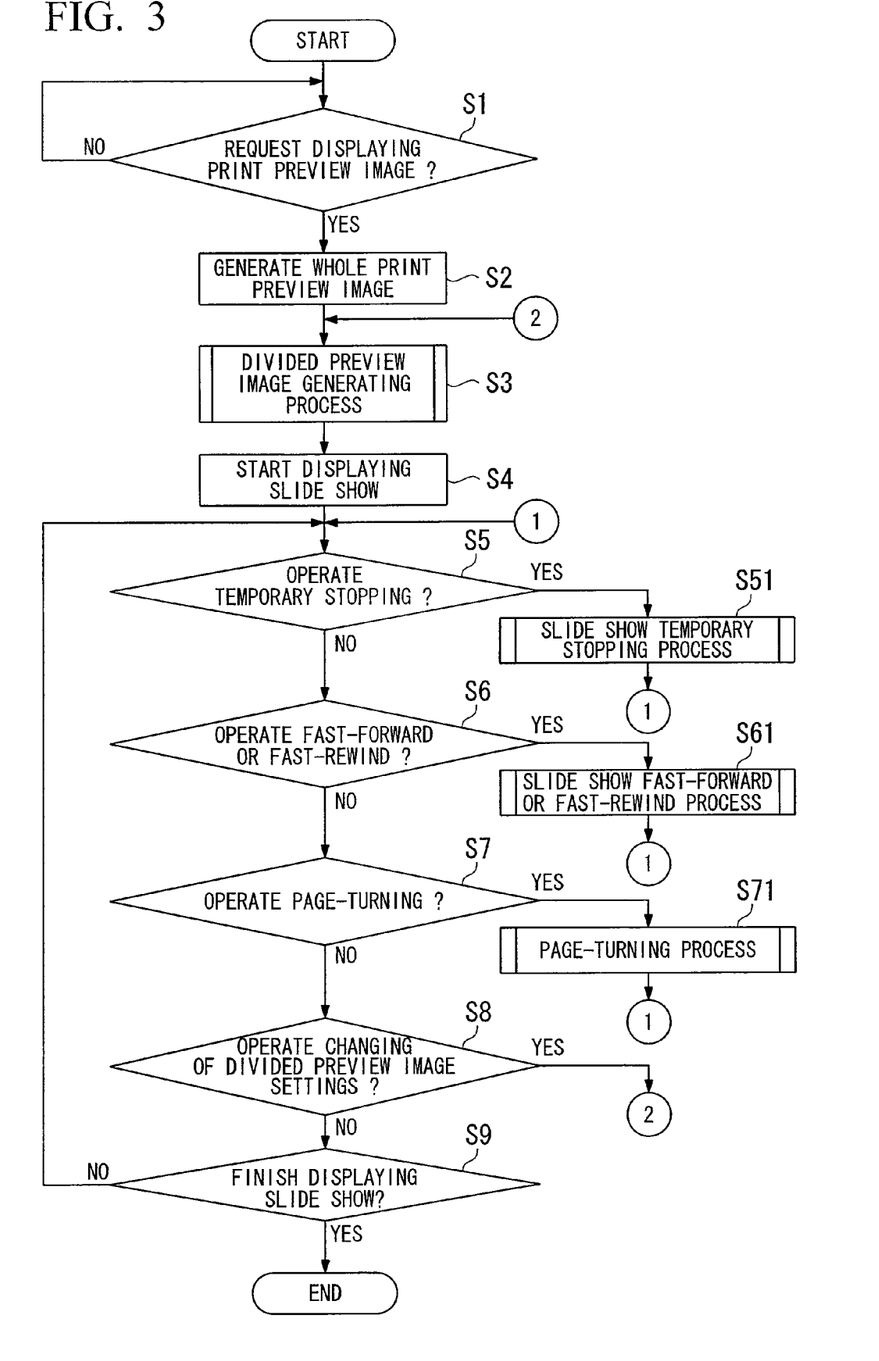
FIG. 3 is a flowchart illustrating an example of a procedure of the print preview image display process performed in the multifunction printer of FIG. 1.

The control unit 6 may include, but is not limited to, an arithmetic unit such as CPU and a recording medium such as a ROM and a RAM. The CPU of the control unit 6 totally controls the multifunction printer X by executing processing according to a prescribed control program that is stored in the ROM. The control unit 6 controls display of a print preview image by the operation and display unit 5 by executing a following print preview image display process that is illustrated in the flowchart of FIG. 3.

(Operation and Display Unit)

Figure 2:
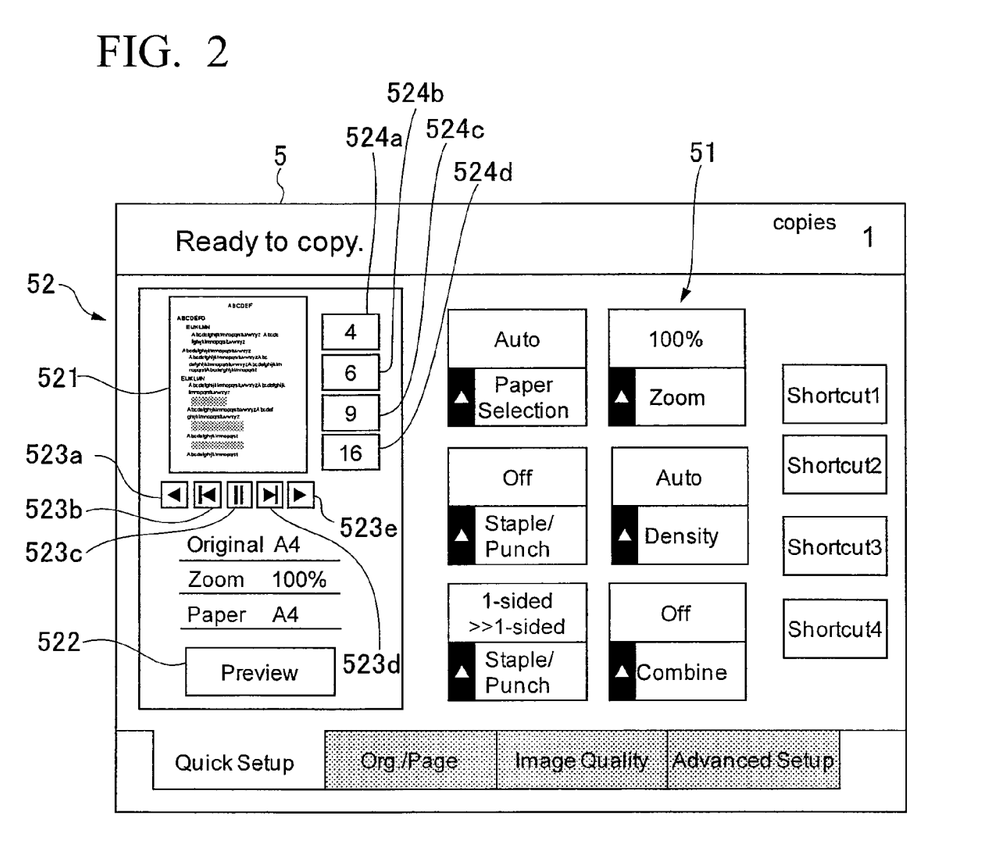
FIG. 2 is a fragmentary view illustrating a whole display screen image of an operation and display unit of the multifunction printer of FIG. 1.

FIG. 2 is a fragmentary view illustrating a whole display screen image of an operation and display unit 5 of the multifunction printer X of FIG. 1. With reference to FIG. 2, the operation and display unit 5 may include, but is not limited to, a print setting unit 51 and a print preview image display unit 52.

The print setting unit 51 may include, but is not limited to, a touch key for performing various kinds of printing settings such as paper size setting, scaling setting, staple punch setting, 2-in-1 setting, etc.

The print preview image display unit 52 displays a print preview image to make user check printing result of the print target data beforehand. The print preview image display unit 52 may include, but is not limited to, a preview image display area 521, a preview image display key 522, preview image operation keys 523a, - - -, 523e, and dividing number setting keys 524a, - - -, 524d.

The preview image display area 521 is a part of display area on the liquid crystal display in the operation and display unit 5. The preview image display area 521 displays the print preview image.

The preview image display key 522 receives instruction from user of displaying the print preview image in the preview image display area 521.

The preview image operation keys 523a, - - -, 523e receive instruction from user for operating contents of display of the preview image display area 521.

The dividing number setting keys 524a, - - -, 524d receive instruction from user of the dividing number of the print preview image when the print preview image is displayed by the following print preview image display process that is illustrated in the flowchart of FIG. 3.

Various keys such as the preview image display key 522, the preview image operation keys 523a, - - -, 523e, and the dividing number setting keys 524a, - - -, 524d are touch keys embodied with a touch panel prepared in the operation and display unit 5.

These keys may be the mechanical switches formed apart from the touch panel. Each function of the preview image display key 522, the preview image operation keys 523a, - - -, 523e, and the dividing number setting keys 524a, - - -, 524d is explained in the latter part with the print preview image display process performed by the control unit 6 that is illustrated in the flowchart of FIG. 3.

(Print Preview Image Display Process and Divided Preview Image Generating Process)

Figure 4:
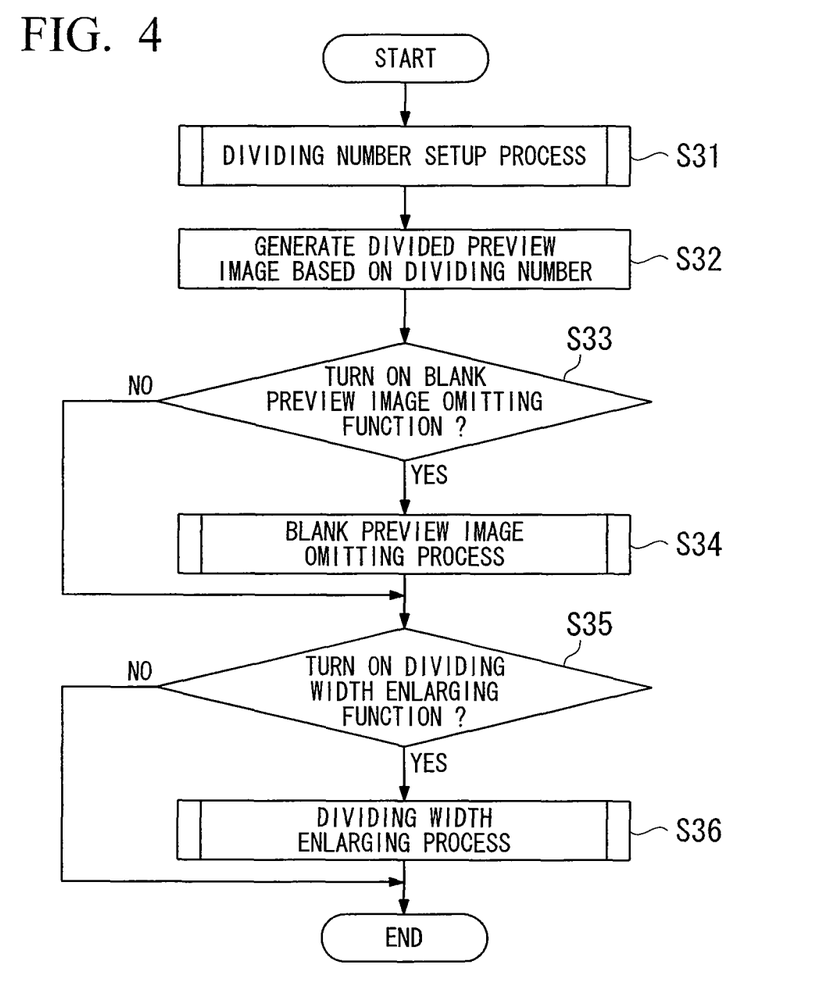
FIG. 4 is a flowchart illustrating an example of a procedure of a divided preview image generating process performed in the multifunction printer of FIG. 1.
Figure 5A:
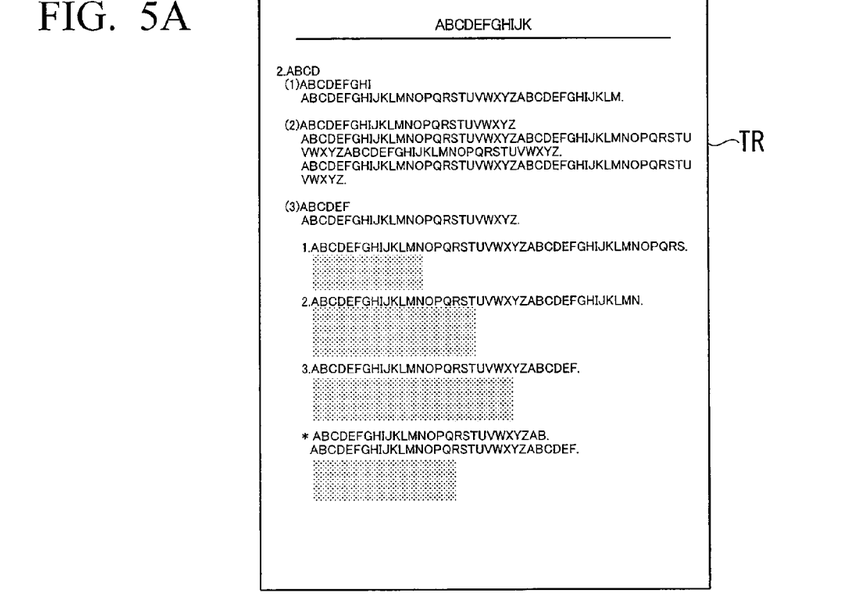
FIG. 5A is a fragmentary view illustrating an example of a whole preview image in accordance with the first preferred embodiment of the present invention.
Figure 5B:
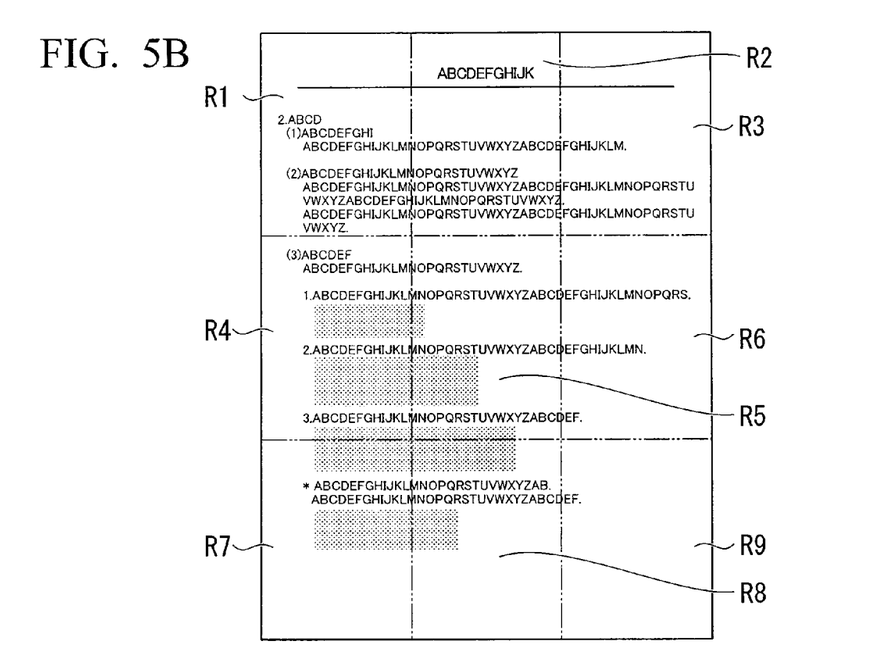
FIG. 5B is a fragmentary view illustrating an example of a procedure of a process of generating a first divided preview image in accordance with the first preferred embodiment of the present invention.
Figure 6:
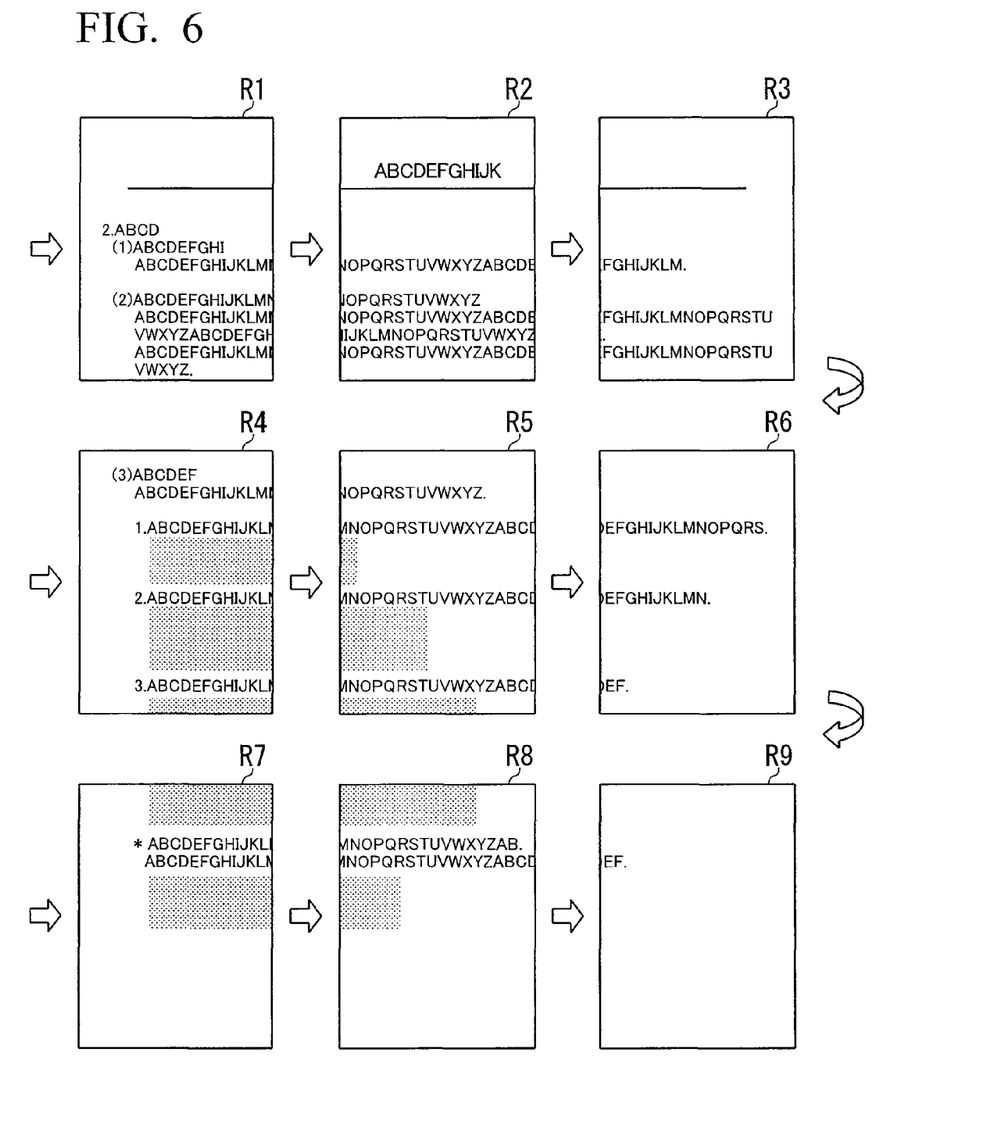
FIG. 6 is a fragmentary view illustrating an example of an order of displaying a divided preview image in accordance with the first preferred embodiment of the present invention.
Figure 7A:
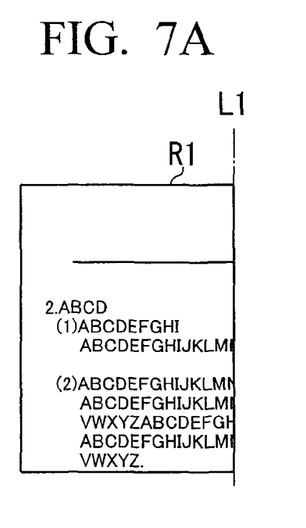
FIG. 7A is a fragmentary view illustrating an example of the first divided preview image in accordance with the first preferred embodiment of the present invention.
Figure 7B:
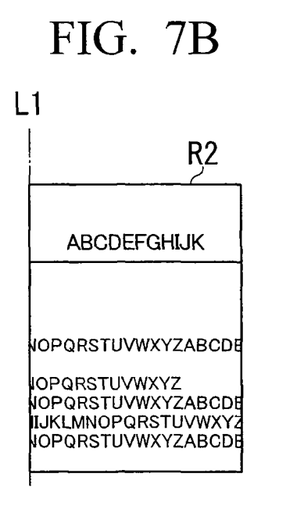
FIG. 7B is a fragmentary view illustrating another example of the first divided preview image in accordance with the first preferred embodiment of the present invention.
Figure 7C:
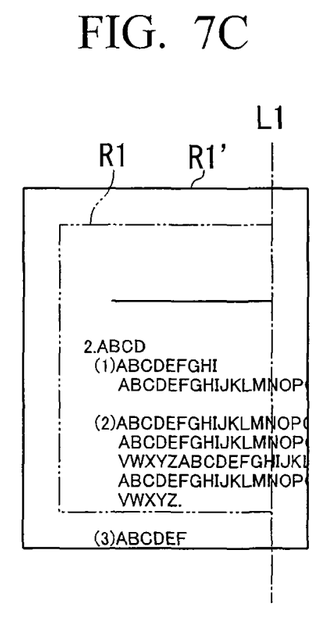
FIG. 7C is a fragmentary view illustrating an example of a second divided preview image corresponding to the first divided preview image of FIG. 7A.
Figure 7D:
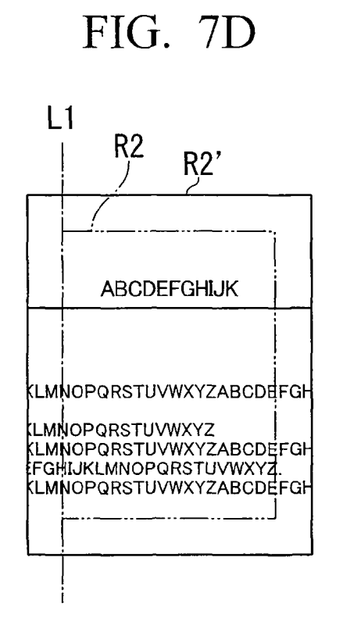
FIG. 7D is a fragmentary view illustrating an example of a second divided preview image corresponding to the first divided preview image of FIG. 7B.
Figure 8A:
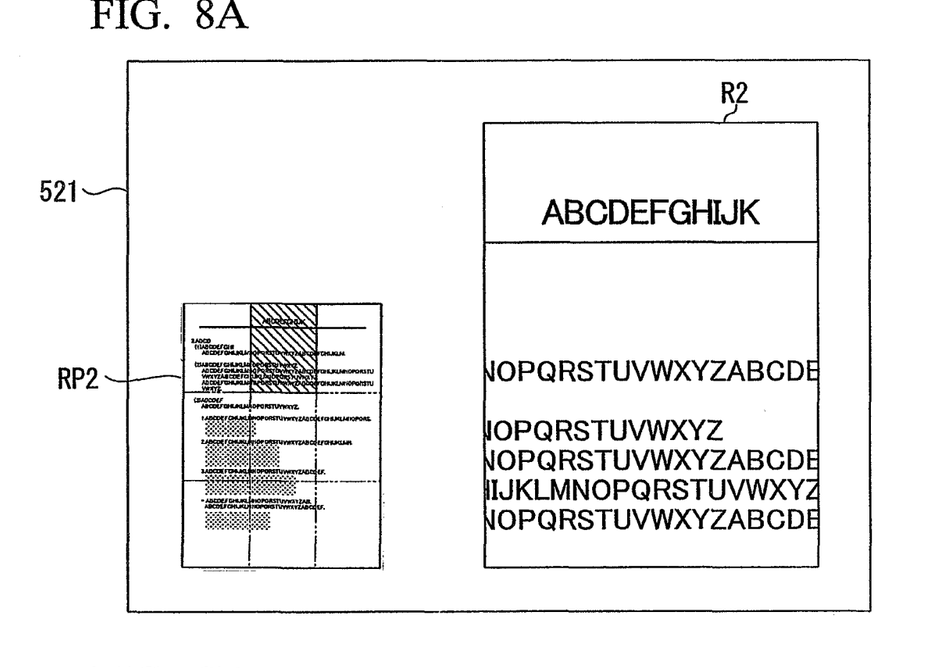
FIG. 8A is a fragmentary view illustrating an example of a display screen image that includes a divided preview image and a position display image in accordance with the first preferred embodiment of the present invention.
Figure 8B:
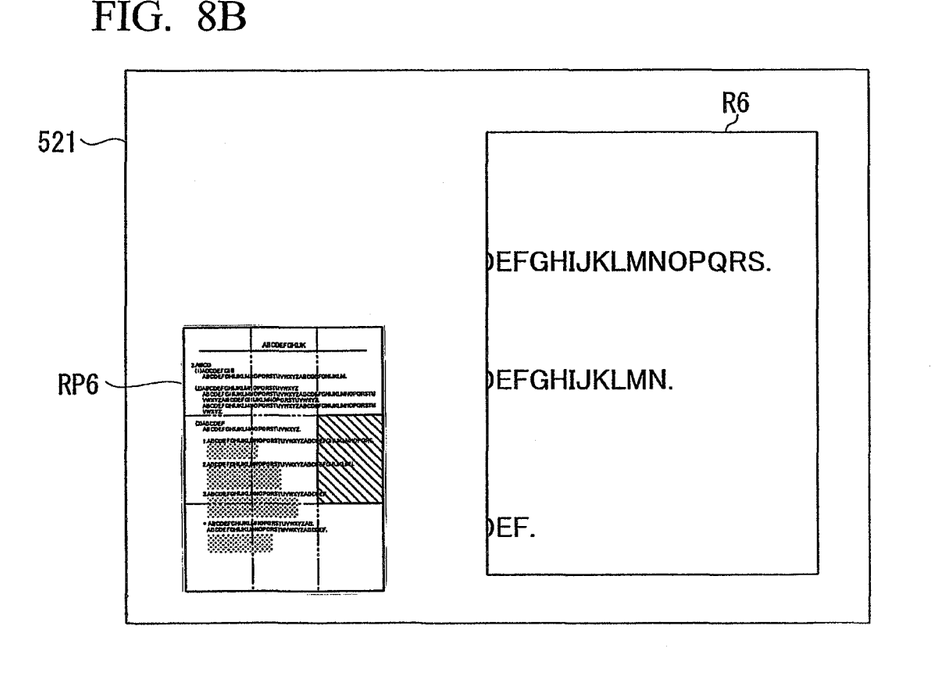
FIG. 8B is a fragmentary view illustrating another example of a display screen image that includes a divided preview image and a position display image in accordance with the first preferred embodiment of the present invention.

FIG. 3 is a flowchart illustrating an example of a procedure of the print preview image display process performed in the multifunction printer X of FIG. 1. FIG. 4 is a flowchart illustrating an example of a procedure of a divided preview image generating process performed in the multifunction printer X of FIG. 1. FIG. 5A is a fragmentary view illustrating an example of a whole preview image in accordance with the first preferred embodiment of the present invention. FIG. 5B is a fragmentary view illustrating an example of a procedure of a process of generating a first divided preview image in accordance with the first preferred embodiment of the present invention. FIG. 6 is a fragmentary view illustrating an example of an order of displaying a divided preview image in accordance with the first preferred embodiment of the present invention. FIG. 7A is a fragmentary view illustrating an example of the first divided preview image in accordance with the first preferred embodiment of the present invention. FIG. 7B is a fragmentary view illustrating another example of the first divided preview image in accordance with the first preferred embodiment of the present invention. FIG. 7C is a fragmentary view illustrating an example of a second divided preview image corresponding to the first divided preview image of FIG. 7A. FIG. 7D is a fragmentary view illustrating an example of a second divided preview image corresponding to the first divided preview image of FIG. 7B. FIG. 8A is a fragmentary view illustrating an example of a display screen image that includes a divided preview image and a position display image in accordance with the first preferred embodiment of the present invention. FIG. 8B is a fragmentary view illustrating another example of a display screen image that includes a divided preview image and a position display image in accordance with the first preferred embodiment of the present invention.

Hereinafter, an example of procedures of the print preview image display process and the divided preview image generating process performed by the control unit 6 will be described according to the flowcharts of FIGS. 3 and 4, referring to FIGS. 5A, - - - , 8B. S1, S2, - - - and S31, S32, - - - in the figures represent the number of a processing procedure that is a step performed by the control unit 6. FIGS. 5A, - - - , 8B are figures to explain execution result of the print preview image display process and the divided preview image generating process, and are figures that show only the preview image display area 521 in the operation and display unit 5.

In the following description, the print target data is a manuscript illustrated in FIG. 5A and the print preview image results from the manuscript.

(Print Preview Image Displaying Process (S1, - - - , S3))

First, in step S1, the control unit 6 judges whether the preview image display key 522 of the operation display unit 5 is operated. In addition, this judgment process is performed before and/or after the process of choosing print target data that is in the printing process performed in the multifunction printer X, for example.

If the control unit 6 judges that the preview image display key 522 is operated ("Yes" in step S1), the control unit 6 judges that it is necessary to display the print preview image about the print target data, and performs the process of step S2. In addition, when the preview image display key 522 is not operated ("No" in step S1), the control unit 6 will not progress to the next process and stands by.

In step S2, the control unit 6 generates a print preview image of the whole of the print target data, hereinafter referred to as a whole preview image. Specifically, the control unit 6 generates the whole preview image by controlling the image processing unit 2. That is, the control unit 6 and the image processing unit 2 correspond to the whole preview image generating unit. In the second embodiment, an image illustrated in FIG. 5A is generated as a whole preview image TR.

Next, the control unit 6 generates divided preview images by dividing the print preview image generated in step S2 by a dividing number set up beforehand (step S3). Process of step S3 is called a process of generating the divided preview image. Specific example of the process of generating the divided preview image in step S3 will be described in accordance with the flowchart of FIG. 4.

(Divided Preview Image Generating Process (S3))
(Step S31)

As illustrated in FIG. 4, in step S31, the control unit 6 sets up dividing number of print preview image of the print target data.

For example, when a value that is initially set up beforehand as the dividing number exists, the control unit 6 uses the initially set up dividing number. In addition, the initially set up value is stored in an internal memory of the control unit 6.

On the other hand, when the dividing number setting keys 524a, - - - , 524d are operated, the control unit 6 sets up the dividing number based on operation in the dividing number setting keys 524a, - - - , 524d. In this way, when performing the process of setting up the dividing number, the control unit 6 functions as a dividing number setting unit.

Specifically, each of the dividing number setting keys 524a, - - - , 524d corresponds to the dividing numbers "4", "6", "9" and "16". In addition, the dividing numbers are not limited to these, and may be "2", "4", "6", "8", "9", "12", "16", and so on.

Timing of performing setting up the dividing number (process of step S31) is not limited to immediately after step S2. This process may be performed when the dividing number setting keys 524a, - - - , 524d are operated while displaying slide show in the process of displaying print preview image illustrated in FIG. 3 (after "Yes" in step S8 described below).

In the following description, the case when the dividing number is set as "9" in accordance with the initial setting or operation of the dividing number setting key 524c will be described, for example.

(Step S32)

Next, in step S32, the control unit 6 generates the divided preview image by controlling the image processing unit 2. In this embodiment, the divided preview image is an image that is generated by dividing the print preview image of each page of the print target data by the dividing number set up in step S31. Specifically, the image processing unit 2 generates the divided preview image by equally dividing the whole preview image by the dividing number. That is, the control unit 6 and the image processing unit 2 correspond to a divided preview image generating unit.

Here, the dividing number is set as "9" in step S31, so one page of the whole preview image is divided by nine as illustrated as broken lines in FIG. 5B. As a result, nine divided preview images R1, - - - , R9 per one page are generated as illustrated in FIG. 6. The generated divided preview images R1, - - - , R9 are stored in a predefined memory in the control unit 6.

In the following description, the divided preview image generated in step S32 is called a first divided preview image and is distinguished from a second divided preview image described below. In some cases, the first divided preview image and the second divided preview image are not distinguished.

(Steps S33 and S34)

As illustrated in FIG. 4, in step S33, the control unit 6 judges whether setting of a blank preview image omitting function is ON or not. When the blank preview image omitting function is set ON ("Yes" in step S33), the following process of step S34 (blank preview image omitting process) is performed. On the other hand, when the blank preview image omitting function is set OFF ("No" in step S33), the process skips to step S35.

The blank preview image omitting process is a process of excluding an image that has blank area more than a predefined upper limit from the first divided preview image generated in step S32 as displaying target. That is, the process of step S34 includes the following steps i), ii) and iii).

i) Detecting blank area included in each of the first divided preview images.

ii) Judging whether the blank area is more than the upper limit or not.

iii) Excluding the divided preview image(s) judged as having a blank area being more than the upper limit in ii).

The blank preview image omitting function is embodied by the control unit 6, as described below in detail.

ON/OFF of the blank preview image omitting function is set in initial setting or by operation of user through the operation display unit 5. The upper limit is set based on printing rate in each of the first divided preview images and so on. For example, the control unit 6 may judge that the blank area in the first divided preview image is more than the upper limit set beforehand about the first divided preview image whose printing rate is 10% or less.

In step S34, the control unit 6 performs the processes of above i) and ii) based on the blank preview image omitting function, and excludes the first divided preview image that includes blank area more than the upper limit set up beforehand from the displaying target. The divided preview image with much blank area can be thought unnecessary in check work of the preview image by user. Therefore, such a divided preview image may be excluded from the displaying target. Especially, as described below, when two or more divided preview images are displayed one by one in the slide show, the total time for displaying all the divided preview images is shortened by decreasing the number of the divided preview images that are displayed.

For example, in FIG. 6, there are too many blank areas in the divided preview image R9. The first divided preview image R9 is a divided preview image corresponding to the lower right end of the print target data. The first divided preview image R9 may be excluded from the displaying target.

Thus, the control unit 6 corresponds to an amount of blank area detecting unit and the preview image excluding unit.

(Steps S35 and S36)

In step S35, the control unit 6 judges whether setting of a dividing width enlarging function is ON or not. Here, when the dividing width enlarging function is ON ("Yes" in step S35), a dividing width enlarging process is performed in the following step S36. On the other hand, when the dividing width enlarging function is OFF ("No" in step S35), the divided preview image generating process ends.

The dividing width enlarging function is a function performing the dividing width enlarging process. The dividing width enlarging process is a process that sets up the range that is wider than outer edge (boundary between the first divided preview images) of the first divided preview image obtained at step S32 by only predetermined width set up beforehand as each divided preview image in the whole preview image. The dividing width enlarging process can be paraphrased to expanding the outside edge of the first divided preview image.

The dividing width enlarging function is embodied by the control unit 6. ON/OFF of the dividing width enlarging function is set up by the initial setting or arbitrarily by operation of user through the operation display unit 5. Moreover, predetermined width may be set as the width that is equivalent to 10% of the width of the first divided preview image, for example.

Specifically, when the dividing width enlarging function is set ON, the control unit 6 sets up the range that is wider than outer edge (boundary between the divided preview images) of each first divided preview image only by predetermined width as the second divided preview image by the dividing width enlarging function in step S36.

In the example illustrated in FIG. 7A, - - - , FIG. 7D, the control unit 6 generates the first divided preview image R1 (FIG. 7A) and the first divided preview image R2 (FIG. 7B) in step S32. In step S36 afterwards, the control unit 6 generates the divided preview image R1' (FIG. 7C) and the divided preview image R2' (FIG. 7D) that occupies a range wider than a boundary L1 only by prescribed width in the whole preview image.

When generating the second divided preview image, the control unit 6 and the image processing unit 2 are equivalent to an enlarged preview image generating unit.

Thus, the control unit 6 can set up the width of the second divided preview image to be wider than the width of the first divided preview image obtained by only dividing the whole preview image only by predetermined width. As a result, the situation can be avoided that when a character exists on the boundary line of the first divided preview image, the whole of the character is displayed on neither of the display screens of the divided preview images.

As described above, if the first and/or the second divided preview image are generated by steps S31, - - - , S36 about the print target data, the divided preview image generating process ends. Process shifts to step S4 of the print preview image display process illustrated in FIG. 3. In addition, when the print target data has pages, divided preview images are generated for every page.

(Print Preview Image Display Process (S4, - - - , S9, S51, S61 and S71))

(Step S4)

In step S4, the control unit 6 starts a slide show. The slide show is displaying one by one the divided preview images generated at step S3 with a predetermined time interval set up beforehand. At this time, the control unit 6 makes each divided preview image enlarged to the size of the preview image display area 521 and displays each divided preview image individually. That is, each divided preview image is displayed in the size in which the whole of the print preview image of the print target data was conventionally displayed. Therefore, user can check easily contents of each divided preview image in the print target data by referring to display of the preview image display area 521.

At this time, when the print target data has pages of data, divided preview images are displayed one by one for every page of the pages of print target data.

In addition, in this embodiment, the case where divided preview images are displayed one by one for omitting time and effort of operation by user is described as an example, but the invention is not limited to the case, and displaying arbitrary divided preview images by user operation can be considered as another embodiment. That is, a display may be changed from the divided preview image R1 to the divided preview image R2 based on directions by user.

In addition, the predetermined time interval set up beforehand is stored in the internal memory of the control unit 6. The control unit 6 can change the predetermined time interval based on operation of the operation display unit 5. That is, when this process is performed, the control unit 6 corresponds to a preview image time changing unit. Thereby, user can realize fast-forward or fast-rewind etc. of the display of the slide show by changing the predetermined time interval by operating the operation display unit 5. In addition, the control unit 6 may perform fast-rewind by reversing a display order of the slide show based on the operation of the operation display unit 5.

In the slide show, each of the divided preview images R1, - - - , R9 is displayed enlarged to the preview image display area 521 of the operation display unit 5 in a order of an arrow illustrated in FIG. 6.

At this time, as described above, when the divided preview image of which display was omitted by the blank preview image omitting function exists, divided preview images other than the omitted divided preview image are displayed one by one.

Moreover, when the width of the divided preview image is extended by the dividing width enlarging function, the second divided preview image is displayed individually with enlarged width. That is, the divided preview image displayed at step S4 may be either of the first divided preview image or the second divided preview image.

In addition, the whole preview image illustrated in FIG. 5A may be displayed before or after displaying of each divided preview image illustrated in FIG. 6. Of course, in the multi-function printer X, only the whole preview image may be displayed and the divided preview image may not be displayed.

When the slide show display is started at step S4 and the divided preview image is displayed one by one, the control unit 6 performs judgment process concerning following steps S5, - - - , S8, and controls contents of display of the print preview image display area 521 by the result of the judgment process.

In addition, steps S5, - - - , S8 are performed until the control unit 6 judges that all of the divided preview images are displayed in step S9 ("No" in step S9).

If the control unit 6 judges that all of the divided preview images are displayed in step S9 ("Yes" in step S9), the print preview image display process ends.

(Step S5)

First, the control unit 6 judges whether the preview image operation key 523c is operated in step S5 (refer to FIG. 2). Here, if the control unit 6 judges that the preview image operation key 523c is operated ("Yes" in step S5), process shifts to step S51. In addition, when the preview image operation key 523c is not operated ("No" in step S5), process shifts to step S6.

In step S51, the control unit 6 temporary stops the slide show display started at step S4. That is, the preview image operation key 523c plays a role of what is called a temporary stop key. When performing the above described process, the control unit 6 corresponds to a temporary stop unit.

Therefore, user can display arbitrary divided preview image for a long time by operating the preview image operation key 523c. By this, user can check a specific divided preview image for a long time.

In addition, in step S51, the control unit 6 cancels a temporary stop based on operation of the preview image operation key 523c for the second time and passage of predetermined time, and continues the slide show display started at step S4.

(Step S6)

Next, the control unit 6 judges whether either of the preview image operation key 523b or 523d is operated in step S6 (refer to FIG. 2). Here, if the control unit 6 judges that the preview image operation key 523b or 523d is operated ("Yes" in step S6), process shifts to step S61. In addition, when either of the preview image operation key 523b or 523d is not operated ("No" in step S6), process shifts to step S7.

In step S61, the control unit 6 forcibly switches the divided preview image displayed in the present based on the operation in step S6. Specifically, when the preview image operation key 523b is operated in step S6, the display is switched to the divided preview image which is immediately before the divided preview image displayed in the present. When the preview image operation key 523d is operated in step S6, the display is switched to the divided preview image which is immediately after the divided preview image displayed in the present. When performing the above described process, the control unit 6 corresponds to a forcible display switching unit.

As a result, user can display arbitrary divided preview images. In addition, in step S61, after displaying the divided preview image after the switching for a predetermined time, the control unit 6 restarts the slide show display by displaying one by one each divided preview image.

(Step S7)

Next, the control unit 6 judges whether either of the preview image operation key 523a or 523e is operated in step S7 (refer to FIG. 2). Here, if the control unit 6 judges that the preview image operation key 523a or 523e is operated ("Yes" in step S7), process shifts to step S71. In addition, when neither of the preview image operation key 523a nor 523e is operated ("No" in step S7), process shifts to step S8.

In step S71, the control unit 6 forcibly switches the display of the divided preview image in the present to display of another divided preview image of a page that is different from the page of which the divided preview image is displayed in the present based on the operation in step S7.

Display of the divided preview image of the print target data that consists of five pages on the whole is described. When the divided preview image that is a part of second page is displayed and the preview image operation key 523a is operated in step S7, the control unit 6 controls the operation and display unit 5 to display the page that is previous in the display order (the divided preview image of the first page). When the preview image operation key 523e is operated in step S7, the control unit 6 controls the operation and display unit 5 to display the page that is following in the display order (the divided preview image of the third page). When performing the above described process, the control unit 6 corresponds to a page switching unit.

As a result, user can display the print preview image of arbitrary page. In addition, after page is switched, each divided preview image of the print preview image of the page after the switching is displayed in order, respectively.

The control unit 6 judges whether operation of changing settings of the divided preview image is made or not in step S8. In addition, when the operation of changing settings of the divided preview image is not made ("No" in step S8), process shifts to step S9.

Here, the operation of changing settings is an operation of the operation and display unit 5 performed by user to change settings of displaying the divided preview image. As described at step S3, the changing settings operation may be changing the dividing number by operation of the dividing number setting keys 524a, - - - , 524d, switching ON or OFF the blank preview image omitting function, and switching ON or OFF the dividing width enlarging function, etc., for example.

When it is judged that the operation of changing settings of the divided preview image is performed ("Yes" in step S8), process shifts to step S3. In step S3, a re-setting of the divided preview image is performed by performing step S31, - - - , S36 based on the operation of changing settings performed in step S8. Then, in step S4, the slide show display of the divided preview image generated by the re-setting starts. In addition, when the setting of other than the dividing number is changed, the slide show display may be restarted from the divided preview image currently displayed when it is judged that the operation for changing a display setting of the divided preview image in step S8 is performed.

As described above, the print preview image display process and the divided preview image generating process (refer to the flowchart of FIGS. 3 and 4) are performed by the control unit 6 in the multifunction printer X, and the print preview image in every page of the print target data is divided into the divided preview images by the dividing number set up beforehand, and each of the divided preview images is displayed in the preview image display area 521 enlarged respectively. That is, when performing the print preview image display process and the divided preview image generating process, the control unit 6 corresponds to a divided preview image generating unit, a divided preview image enlarging unit, and a divided preview image display control unit.

Therefore, user can check contents of the print target data easily by referring to each of the divided preview images displayed on the preview image display area 521.

As described above, the multifunction printer X is an example of an image forming apparatus that includes an image forming unit that prints image on papers based on print target data, a whole preview image generating unit that generates a whole preview image based on the print target data, the whole preview image being a print preview image of the entirety of each page, a display unit that displays image, a whole preview image display control unit that controls the display unit displaying the whole preview image, a divided preview image generating unit that generates divided preview images, the divided preview images being made by dividing the print preview image of each page in the print target data by a dividing number, the dividing number being set beforehand, a divided preview image enlarging unit that enlarges each of the divided preview images at higher magnification than a display magnification of the whole preview image of the display unit and generates enlarged divided preview images, and a divided preview image display control unit that controls the display unit displaying the enlarged divided preview images.

User of the image forming apparatus can check contents of the print target data by seeing each of the divided preview images displayed in the display unit respectively.

Especially, if the divided preview image display control unit makes the divided preview images displayed one by one with the predetermined time interval set up beforehand, time and effort of operation by user referring to each of the divided preview images can be omitted.

However, even if it is a case where the divided preview images are displayed one by one, it is desirable that the divided preview image displayed on the display unit can be arbitrarily determined by user's will.

The image forming apparatus may further include the forcible display switching unit that forcibly switches the display from the current divided preview image displayed in the present to the divided preview image which is immediately after the current divided preview image or the divided preview image which is immediately before the current divided preview image, when the divided preview images are displayed one by one by the divided preview image display control unit. The image forming apparatus may further include the temporary stop unit that temporarily stops displaying one by one the divided preview images, which is controlled by the divided preview image display control unit.

The image forming apparatus may further include the preview image time changing unit that changes the predetermined time based on operation of a predetermined time control unit.

Here, when the print target data includes pages of data, the divided preview image display control unit controls displaying the divided preview images of each page of the pages one by one. For example, after displaying of all divided preview images of the first page is finished, the divided preview image of the following second page is displayed in order.

However, when checking pages of data in the above way, user may be forced to wait a long time until the page that user wants to check is displayed. So the image forming apparatus may preferably further include the page switching unit that forcibly switches the displayed page from the current page included in the divided preview image displayed in the present to a page that is immediately after the current page or a page that is immediately before the current page in displaying order, when the divided preview images are displayed one by one, which is controlled by the divided preview image display control unit. Thereby, user can display the divided preview image of a desired page at an early time.

By the way, the divided preview image display control unit may exclude the divided preview image of which the blank area is more than the upper limit set beforehand from displaying target. In addition, a comparative judgment of the blank area in each of the divided preview images and the upper limit may be performed based on a printing rate etc. As a result, displaying a divided preview image that need not be checked since there are many blank areas can be avoided. Especially, when the divided preview images are displayed one by one, since the display of the divided preview image with many blank areas that need not be checked can be skipped, the total time for displaying all the divided preview images can be shortened.

Though the dividing number may be a value set up beforehand, the image forming apparatus may preferably further include the dividing number setting unit that sets up the dividing number based on operation of a predefined operating unit. As a result, user can set up the dividing number and can display the divided preview image in desired enlarged size when using the image forming apparatus.

The image forming apparatus may preferably further include a position display unit that displays position of the divided preview image that is controlled by the divided preview image display control unit in the print target data. As a result, user can easily grasp the position of each divided preview image in the print target data.

The divided preview image display control unit may divide the print preview image of each page of the print target data evenly by the dividing number. Specifically, the dividing number may one of 2, 4, 6, 8, 9, 12 and 16, for example. When the print preview image is evenly divided like this, it is possible to display each part of the print preview image enlarged only by setting the dividing number without performing setting of boundary position of each divided preview image etc. When the print preview image is not evenly divided, the boundary position of each divided preview image can be set based on operation by user.

Second Embodiment

A second embodiment is a concrete example of the dividing width enlarging function described in step S36 in step S3 (Refer to FIG. 4).

Specifically, the dividing width enlarging process may enlarge outer edge of the divided preview image of the divided preview image R1, - - - , R9 that has a character on a boundary line with other divided preview image by only predetermined width.

That is, the control unit 6 may judge whether character is on the boundary line of the first divided preview image, enlarge the first divided preview image that touches the boundary line on which character exists, and generate the second divided preview image. So the control unit 6 corresponds to a character detecting unit.

When the boundary line between the divided preview images crosses character, it is desirable to enlarge range of each divided preview image R1, - - - , R9 for user to see the whole character. Thus, in this embodiment, range of each divided preview image can be enlarged by the predetermined width only when desirable. That is, in this embodiment, it is prevented that range of each divided preview image R1, - - - , R9 is unnecessary enlarged.

Value of the predetermined width by which the range is enlarged by the dividing width enlarging function may be set beforehand. The predetermined width may be a width that enables user to recognize character on the boundary line.

However, the size of the character that exists on the boundary line changes with print target data.

Then, when character exists on the boundary line of each divided preview image, the control unit 6 detects size of the character, and sets up width that reaches an edge outside the character that exists on the boundary line based on the detection result as predetermined width. As a result, the enlarged width of each divided preview image is automatically set as the minimum width with which character on the boundary line can be recognized. That is, when performing the above process, the control unit corresponds to a character size detecting unit and a range setting unit.

Here, after dividing the print preview image and generating the divided preview images, width of each divided preview image is corrected to become a larger range. However, besides this, position of the boundary line of dividing may be set up so that the divided preview image after dividing the print preview image has a larger range only by the predetermined width.

Moreover, the control unit 6 may enlarge width of only the part where character exists on the boundary line, without enlarging width of all the four quarters of each divided preview image. For example, in the example illustrated in FIGS. 7A, - - - , 7D, only the width on the right-hand side of the divided preview image R1 is enlarged, and only the width of the left-hand side and right-hand side of the divided preview image R2 is enlarged.

Third Embodiment

In the slide show display started at step S4, each divided preview image is displayed enlarged respectively. Therefore, it is desirable that image is displayed so that user can specify which position the divided preview image currently displayed in the preview image display area 521 corresponds to in the whole print target data.

Then, the control unit 6 can display a position displaying image that shows position of the divided preview image currently displayed in the print target data with the divided preview image in the slide show display started at step S4. When performing the above process, the control unit 6 corresponds to the position display unit.

For example, FIGS. 8A and 8B are figures illustrating other examples of display in the preview image display area 521. FIG. 8A illustrates the divided preview image R2 and the position displaying image RP2 in the preview image display area 521. FIG. 8B illustrates the divided preview image R6 and the position displaying image RP6 in the preview image display area 521.

As illustrated in FIG. 8A, when the divided preview image R2 is displayed, the position displaying image RP2 in which the position in the whole print target data of the divided preview image R2 is hatched is displayed with the divided preview image R2. In the same way, when the divided preview image R6 is displayed, the position displaying image RP6 in which the position in the whole print target data of the divided preview image R6 is hatched is displayed with the divided preview image R6.

Thus, user can check the display of the preview image display area 521 with relative position and the divided preview image displayed. As a result, user can easily recognize content of each divided preview image R1, - - - , R9 and position in the whole print target data of the divided preview image currently displayed. In addition, displaying method that can specify the position of the divided preview image in the whole print target data is not limited to the above described method.

In addition, in either of the above embodiments, the divided preview image that is displayed may be the first divided preview image or the second divided preview image.

It is apparent that the present invention is not limited to the above embodiments, but may be modified and changed without departing from the scope and spirit of the invention.

What is claimed is:

1. An image forming apparatus comprising:
an image forming unit that prints an image on papers based on print target data;
a whole preview image generating unit that generates a whole preview image based on the print target data, the whole preview image being a print preview image of the entirety of each page of the print target data;
a display unit that displays an image;
a whole preview image display control unit that controls the display unit to display the whole preview image;
a divided preview image generating unit that generates divided preview images, the divided preview images being generated by dividing the print preview image of each page of the print target data by a dividing number, the dividing number being set beforehand;
a divided preview image enlarging unit that enlarges each of the divided preview images at higher magnification than a display magnification of the whole preview image on the display unit and generates enlarged divided preview images;
an entry unit that accepts an instruction from a user; and
a divided preview image display control unit that controls the display unit to display one or more dividing number keys, each of the one or more dividing number keys being associated with a dividing number, and also to display the divided preview images or the enlarged divided preview images automatically in a predetermined order, the divided preview image display control unit stopping the automatic display of the divided preview images or the enlarged divided preview images if the entry unit accepts an instruction from the user during the automatic display, the instruction comprising a user selection of one of the displayed dividing number keys, the user selection being associated with a dividing number, and the dividing number being associated with the selected one of the displayed dividing number keys;
wherein, based on the dividing number associated with the user selection, the divided preview image generating unit generates new divided preview images and, if the new divided preview images are to be enlarged, the divided preview image enlarging unit generates new enlarged divided preview images, the divided preview image display control unit controlling the display unit to display the new divided preview images or the new enlarged divided preview images automatically in a predetermined order, and
wherein the divided preview image enlarging unit comprises an enlarged divided preview image generating unit that generates enlarged divided preview images, each of the generated enlarged divided preview images occupying area in the print preview image wider by a predetermined width than the divided preview image that is generated by dividing the print preview image by the dividing number.

2. The image forming apparatus according to claim 1, further comprising:
a forcible display switching unit that forcibly switches an image displayed by the display unit from one of the divided preview images to a next divided preview image or a preceding divided preview image when the display unit is displaying one by one the divided preview images.

3. The image forming apparatus according to claim 1, further comprising:
   a pause unit that controls the display unit to continue to display the divided preview image currently displayed.

4. The image forming apparatus according to claim 1, further comprising:
   an entry unit that accepts user's instructions;
   a preview image time changing unit that changes a time length of displaying each of the divided preview images based on the user's instructions accepted by the entry unit.

5. The image forming apparatus according to claim 1, wherein
   the divided preview image generating unit generates divided preview images from a page when the print target data includes pages of data, and
   the divided preview image display control unit controls the display unit to display one by one the generated divided preview images from the page of the pages of data.

6. The image forming apparatus according to claim 5, further comprising:
   a page switching unit that forcibly switches display from a currently displayed divided preview image to another divided preview image that is included in a page next in displaying order to a page including the currently displayed divided preview image.

7. The image forming apparatus according to claim 1, wherein the divided preview image display control unit controls displaying one by one the divided preview images with a predetermined time interval set beforehand.

8. The image forming apparatus according to claim 1, further comprising:
   an amount of blank area detecting unit that detects an amount of blank area included in each of the divided preview images; and
   a preview image excluding unit that excludes a divided preview image, including blank area more than a predetermined amount, from being displayed on the display unit based on a result of detection of the amount of blank area detecting unit.

9. The image forming apparatus according to claim 1, further comprising:
   a dividing number setting unit that sets the dividing number based on the instruction of the user accepted by the entry unit.

10. The image forming apparatus according to claim 1, further comprising:
    a position display unit that displays a position in the print target data of the divided preview image currently displayed.

11. The image forming apparatus according to claim 1, further comprising:
    a character detecting unit that detects existence of a character on a boundary line that is made by dividing the print preview image, and wherein
    the enlarged divided preview image generating unit generates an enlarged divided preview image including an area wider by the predetermined width than the boundary line on which the character detecting unit detects the character.

12. The image forming apparatus according to claim 11, further comprising:
    a character size detecting unit that detects a size of the character that exists on the boundary line; and
    a range setting unit that sets a width between the boundary line and the outer edge of the character that exists on the boundary line as the predetermined width.

13. The image forming apparatus according to claim 1, wherein
    the divided preview image display control unit controls the display unit to display one by one of the divided preview images with a predetermined time interval set beforehand.

14. The image forming apparatus according to claim 1, further comprising:
    an amount of blank area detecting unit that detects an amount of blank area included in each of the divided preview images; and
    a preview image excluding unit that excludes a divided preview image, including blank area more than a predetermined amount, from being displayed on the display unit based on a result of detection of the amount of blank area detecting unit.

15. The image forming apparatus according to claim 1, further comprising:
    a position display unit that displays a position in the print target data of the divided preview image currently displayed.

16. A method of displaying preview images that is performed in an image forming apparatus, wherein the image forming apparatus comprises an image forming unit, a display unit, and an entry unit that accepts an instruction from a user, a whole preview image is displayed on the display unit, and the whole preview image is a print preview image of the entirety of each page of print target data to be printed on paper, the method of displaying preview images comprising:
    generating divided preview images by dividing the print preview image of each page of the print target data by a dividing number set beforehand;
    enlarging each of the divided preview images in larger magnification than display magnification of the whole preview image in the display unit if each of the divided preview images is to be enlarged;
    displaying one or more dividing number keys, each of the one or more dividing number keys being associated with a dividing number, and also automatically displaying each of the divided preview images or the enlarged divided preview images on the display unit in a predetermined order; and
    if during the automatic display, the entry unit accepts an instruction from the user, the instruction comprising a user selection of one of the displayed dividing number keys, the user selection being associated with a dividing number, and the dividing number being associated with the selected one of the displayed dividing number keys,
    stopping the automatic display of the divided preview images or the enlarged divided preview images;
    generating new divided preview images by dividing the print preview images of each page of the print target data by the dividing number associated with the user selection;
    enlarging each of the new divided preview images in larger magnification than display magnification of the whole preview image in the display unit if each of the new divided preview images is to be enlarged, each of the new enlarged divided preview images occupying area in the print preview image wider by a predetermined width than the new divided preview image that is generated by dividing the print preview image by the dividing number accepted by the entry unit; and
    displaying automatically each of the new divided preview images or the new enlarged divided preview images on the display unit in a predetermined order.

17. The method of displaying preview images according to claim 16, wherein each of the generated enlarged divided preview images occupies area in the print preview image wider by a predetermined width than each of the divided preview images that is generated by dividing the print preview image by the dividing number.

\* \* \* \* \*